Nov. 24, 1964    I. H. ALEXANDER    3,158,317
CONTROL DEVICE
Filed July 8, 1963    5 Sheets-Sheet 1
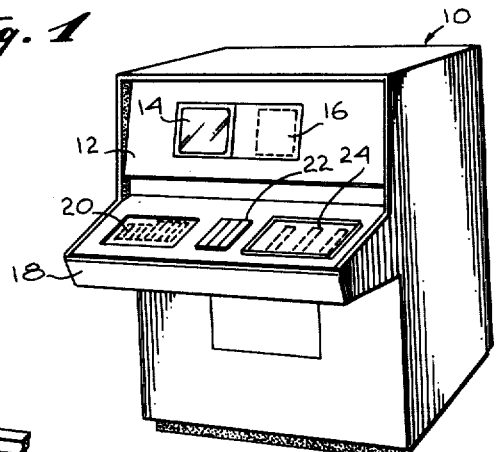
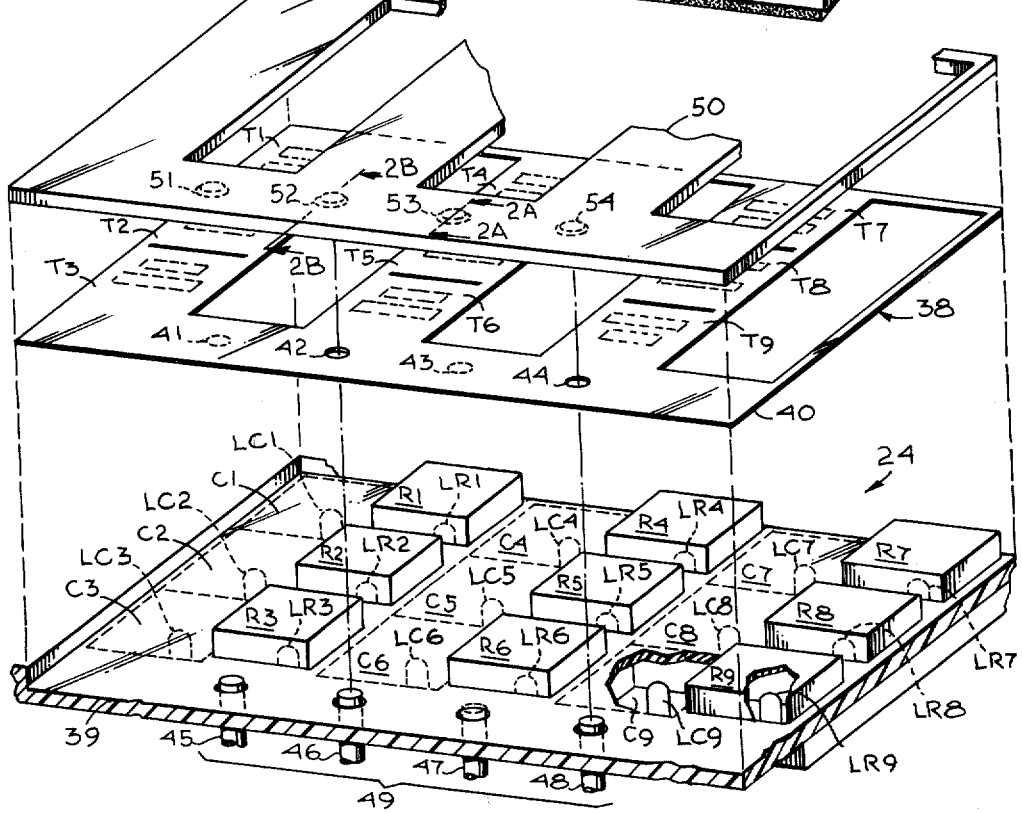
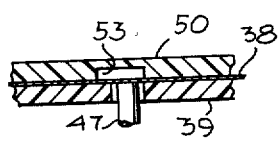
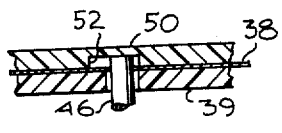
IRVING H. ALEXANDER
INVENTOR.
BY *Allen M. Sutton*
ATTORNEY Nov. 24, 1964 — I. H. ALEXANDER — 3,158,317
CONTROL DEVICE
Filed July 8, 1963 — 5 Sheets-Sheet 2

INVENTOR.
IRVING H. ALEXANDER
BY
ATTORNEY

Nov. 24, 1964     I. H. ALEXANDER     3,158,317
CONTROL DEVICE
Filed July 8, 1963     5 Sheets-Sheet 4
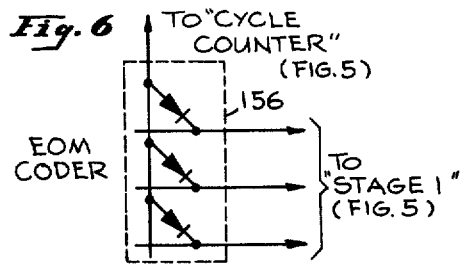
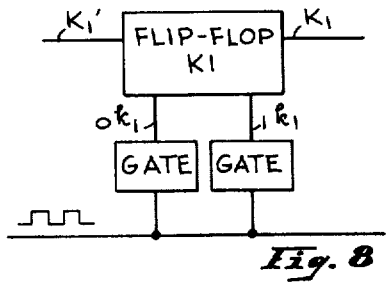
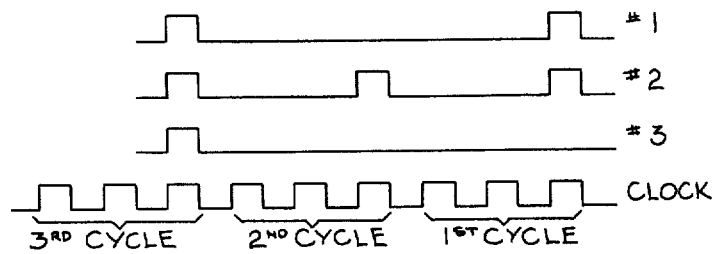
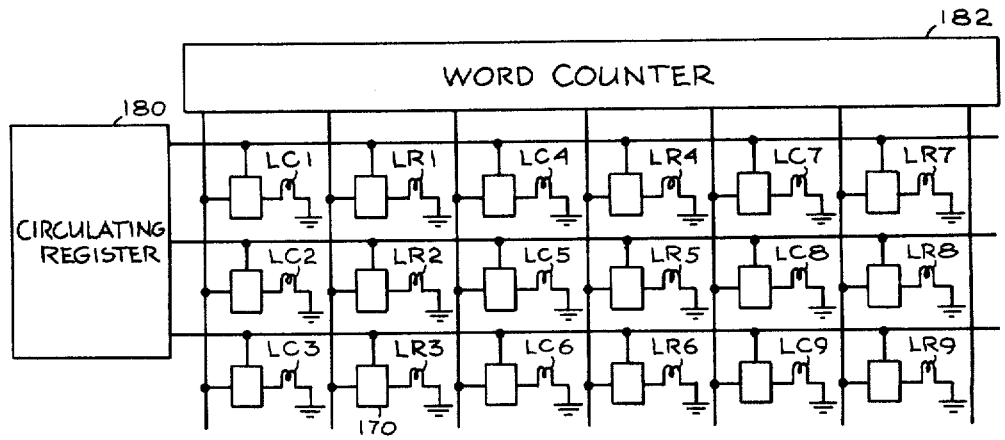
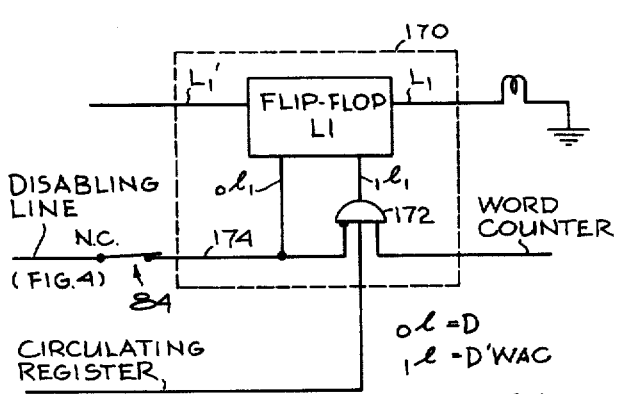
IRVING H. ALEXANDER
INVENTOR.
BY
ATTORNEY

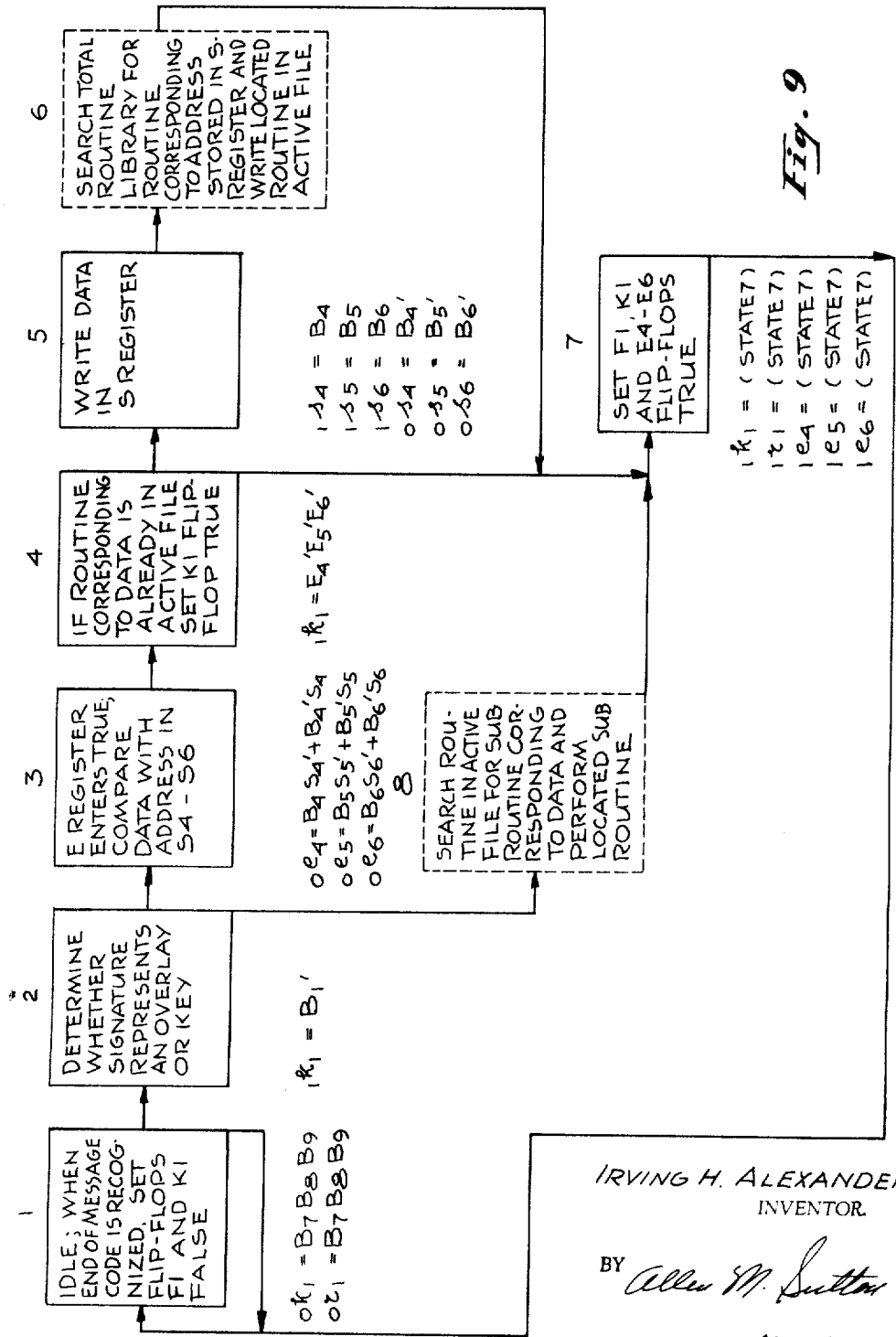

United States Patent Office 3,158,317
Patented Nov. 24, 1964

3,158,317
CONTROL DEVICE
Irving H. Alexander, Canoga Park, Los Angeles, Calif., assignor, by mesne assignments, to The Bunker-Ramo Corporation, Canoga Park, Calif., a corporation of Maryland
Filed July 8, 1963, Ser. No. 293,529
20 Claims. (Cl. 235—145)

This invention relates generally to electrical control devices and, more particularly, to a control device which is particularly suited to act as an input/output device for use in conjunction with a digital computer for facilitating communication between a human operator and the computer.

In the use of digital computers for problem analysis, it is usually initially necessary for a requester to present a request to a programmer in order to code the request in such terms as to be compatible with the computer. Secondly, it is necessary to operate input equipment capable of generating signals corresponding to the coding, and for these signals to be entered into the computer. Thereafter, the computer will perform the operations specified by the request and produce output signals which may be presented in various forms.

The procedural chain which necessitates the programmer coding the requester's request often makes it impossible to obtain a response in a reasonably fast time. Often, total response times dwarf the actual time required by the computer, which is usually capable of providing responses in fraction of a second once the appropriate data has been supplied to it. In order to lessen total response time, input/output devices have been developed which can be electrically tied to the computer so as to achieve this purpose for certain specialized applications. The input/output devices developed to date, however, are generally limited to a relatively small number of functions in the data processing and display chain.

Excessive total response times are made even less tolerable by the fact that certain problems are only partially amenable to solution by electronic data processing. Many problem areas, as, for example, management control, logistics, and air traffic control, often can better be investigated if human intervention is permitted for making certain decisions during the data processing. The reason for permitting human intervention is that in some cases, the nature of the data, types of decision required and relative importance of various factors are too unpredictable for automatic processing and it is not practical to write programs to cover all possible situations. This is especially true where some situations remain unknown until they are actually encountered, and are not capable of being anticipated for inclusion in a program.

Another reason preventing completely automatic handling of certain problems is the fact that trial and error procedures must often be used in the processing. In many instances, human intervention is necessary to determine the exact nature and validity of each trial solution. Further, certain data employed in the processing may be qualitative in form and therefore not readily capable of being handled by the computer. Such qualitative data is often too complex to integrate, as a practical matter, into automatic procedures and therefore must be considered by an operator.

To date, the computer art has developed to an extent where processing speeds of computer systems are not limited by the computer itself but rather by the input and output equipment utilized. In order to permit optimum use of the computer's extensive capabilities, it is desirable to utilize the minimum amount of input/output hardware which permits efficient use of the maximum amount of computer capabilities. In order to reduce the total response times discussed above, it is desirable to eliminate time consuming portions of the usual operational chain pointed out and particularly that portion of the chain which necessitates that the requester communicate with a computer system by way of a programmer.

In the complexities of modern business, varied and unrelated problems often arise to whose solution a computer may contribute to an appreciable extent. For example, an executive of a large chain store may be interested in obtaining detailed data with respect to the sales history of a particular item. A completely unrelated problem may have to be solved by the store's inventory manager with respect to prevent inventory levels and their relationship with anticipated sales. Another situation may involve the accountant who often has occasion to investigate various aspects of the store's payroll. It is apparent that the executive, the inventory manager and the accountant all are investigating essentially unrelated problems whose solutions, taken together, are necessary to the proper functioning of the store operation. Although it is apparent that large-scale computer systems are easily capable of storing, manipulating and retrieving sufficient information to facilitate analysis and solution of the complex and unrelated problems of each of the parties mentioned, the development of appropriate input/output equipment which permits effective minimization of the total response time from request to solution continues to be necessary. The present invention contributes to this development by automatically associating the requester with the stored computer routine effective in providing a solution to his problem.

In the light of the above, it is a general object of this invention to provide a control device for facilitating communication between a human operator and an electronic apparatus.

It is a more particular object of this invention to provide an input/output device which permits a human operator to directly communicate with an electronic computer without the necessity of a programmer independently coding the request made in the requester's language.

It is a still more particular object of this invention to provide an input/output device whose basic functions can be very easily and quickly modified to suit the immediate purposes of a plurality of different users.

Briefly, the invention includes a keyboard comprising the computer input device, a set of perforated sheets adapted to be individually installed on the keyboard as "overlays" and associated computer networks and equipment. Each overlay relates to a particular problem area and corresponds to a routine stored in the computer equipment. When installed on the keyboard, the overlay actuates a combination of switches located under the keyboard, the combination being unique to the particular overlay and comprising a code which is converted to signals transmitted to the computer to effectuate a "lookup" sequence for the corresponding address in its memory. The information in the address, when accessed, comprises the selected routine. Subsequent depression of keys of the keyboard causes the computer to perform subroutines (portions of the selected routine) corresponding to human language labels, on the overlay, adjacent the keys. A light is associated with each key and each label and means are provided coupling the lights to the output of the computer such that the computer controls their illumination for indicating to an operator his previous action and subsequent action options.

Each overlay may consist of thin sheet of a relatively tough plastic material, such as a polyester, on which the labels may be printed. The particular combination of switches actuated is related to the presence or absence of holes in the overlay. When the overlay is installed on the keyboard with a relatively heavy transparent plate (compared to the weight of overlay) holding it down, those switches located where there are no holes in the overlay are actuated, whereas those switches located where there are holes are not actuated. Thus each overlay bears its own unique code.

Other objects and advantages will become subsequently apparent in the light of the fuller description below, reference now being made to the accompanying drawings forming a part hereof wherein like numerals refer to like parts throughout, and in which:

FIGURE 1 is a perspective view showing the external configuration of an input/output console in which the invention may be embodied;

FIGURE 2 is an enlarged fragmentary perspective view of the console request keyboard of FIGURE 1 and an overlay sheet and holding plate adapted to be fitted in place over the keyboard;

FIGURES 2A and 2B are fragmentary sectional views taken on the lines 2A—2A and 2B—2B, respectively, of FIGURE 2 showing an unactuated switch and an actuated switch, respectively;

FIGURE 6 is a diagram of the circuit of the end of message coder of FIGURE 5;

FIGURE 7 is a graph representing an exemplary coded signal input to the computer of FIGURE 5;

FIGURE 8 is generic representation of a flip-flop K1 shown for the purpose of explaining the terminology of the specification;

FIGURE 9 is an extract of the computer flow diagram relevant to the present invention;

FIGURE 10 is a schematic diagram of the light circuitry of the keyboard of FIGURE 2; and FIGURE 11 is a more detailed showing of the circuitry used in conjunction with each light in FIGURE 10.

Figure 3:
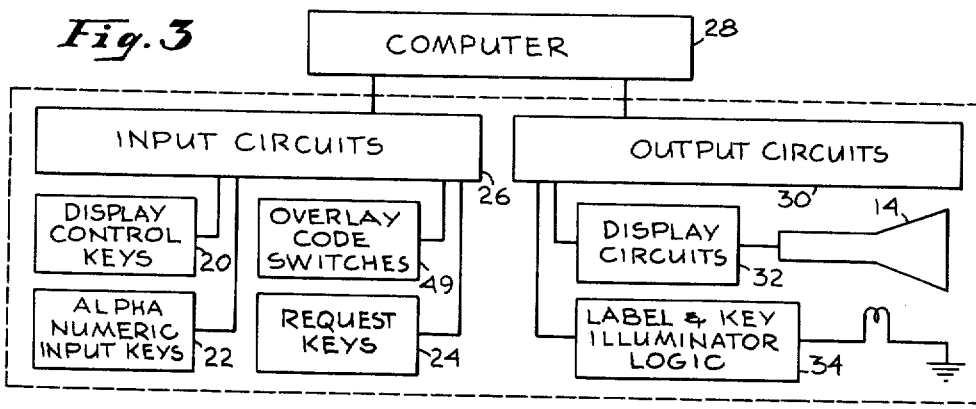
FIGURE 3 is a block diagram showing the over-all relationships between the portions of the input/output console of FIGURE 1 and a computer to which the console is connected.
Figure 4:
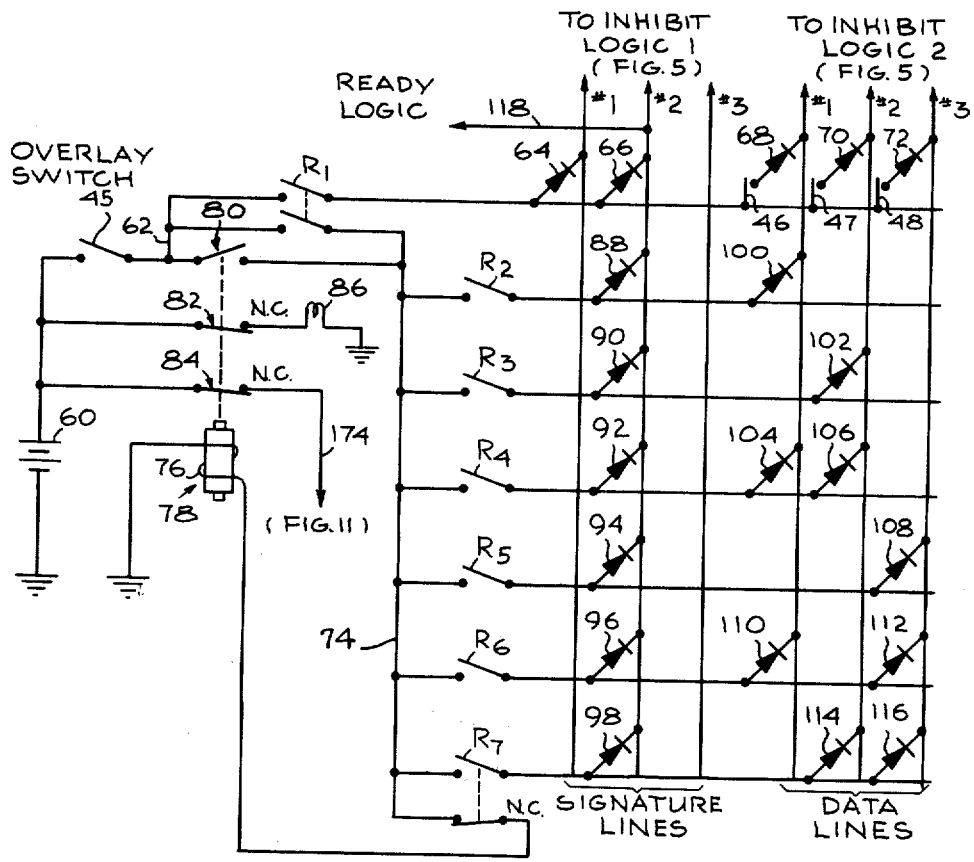
FIGURE 4 is a diagram of a circuit associated with the keyboard of FIGURE 2 for generating coded signals identifying the overlay sheets and request keys.

With continuing reference to the drawings, initial attention is called to FIGURES 1 and 3 wherein are shown respectively a physical embodiment of a display console in which the features of the present invention may be incorporated and a functional block diagram illustrating the manner in which the console is utilized with a computer for problem analysis. The console of FIGURE 1 includes a housing 10 defining a front panel 12 through which the face of a cathode ray tube 14 projects. A plurality of indicators 16 also project through the panel 12 so as to be clearly visible to an operator sitting in front thereof. The housing 10 is provided with a shelf or desk portion 18 (arranged so that the operator may sit opposite the panel 12 with his knees beneath the shelf 18) carrying thereon keyboards 20, 22, and 24. The keyboards 20 and 22 comprise respectively display control and alphanumeric input keys. As indicated in FIGURE 3 (wherein the dotted rectangle represents the housing 10), the keyboards and also overlay code switches 49 are capable of generating signals which are conveyed to an input circuit 26, and then to a digital computer 28. The computer 28 is coupled through output circuits 30 and then through display circuits 32 and illuminator logic 34 respectively to the cathode ray tube 14 and the lights associated with keyboard 24. The improvement herein principally concerns the use and attendant advantages of the request keyboard 24. The detailed showing of request keyboard 24 offered in FIGURE 2 reveals a plurality of request keys R1, R2, R3 . . . R8, R9. Although the request keyboard 24 is shown to include only nine keys, it will be realized that the quantity of keys has been chosen for exemplary purposes only and a much greater number of keys could be utilized. Each of the request keys R1–R9 is translucent for the purpose of permitting the illumination of respective light sources LR1–LR9 disposed therebeneath to be visible through the keys. The keys R1–R9 constitute switch actuators which, when depressed, actuate pulse type switches (FIGURE 4). Adjacent each of the keys R1–R9 is a cavity C1–C9. Each of the cavities C1–C9 respectively has mounted therein a light source LC1–LC9. A sheet 38 is adapted to overlay the keyboard 24 with the keys R1–R9 projecting through openings in the sheet and with labeled translucent portions T1–T9 of the sheet disposed immediately above the cavities C1–C9. The sheet 38 lies on a translucent plate 39 having openings through which the request keys R1–R9 project. The translucent portions T1–T9 of the overlay 38 have a cross sectional area identical to that of the cavities C1–C9 so that when placed on the keyboard 24, each translucent portion will overlay and cover a cavity and also become associated by position with an adjacent request key. Human language indicia is inscribed on each of the translucent portions T1–T9 and thereby serves to label in human language the computer function that will be initiated by the depression of any of request keys R1–R9.

It has been pointed out that the invention involves a computer storing a multiplicity of diverse routines and provides a requester with improved means with which to initiate subroutines in order to investigate particular problem areas. In order for the computer to recognize the problem area with which the requester is concerned and make available the appropriate routine corresponding thereto, a plurality of different overlay sheets 38 are provided, each sheet having identifying encoding means such as circular holes in its end portion 40 at locations designated 41–44. As shown by broken lines, there are no holes at locations 41 and 43 but there are holes at locations 42 and 44. The locations at which holes exist serve to uniquely identify each overlay sheet 38. It will be appreciated that eight distinct code possibilities are provided when three holes are utilized, thereby permitting the use of eight overlay sheets. (However, as will be seen below, one code possibility is used to represent an end of message code so actually in the embodiment illustrated only seven sheets may be used.)

When an overlay sheet 38 is installed over the keyboard 24, its hole positions 41–44 respectively overlie the positions of the actuators of a plurality of switches 45–48, which extend upwardly through the plate 39. The switches are collectively designated as 49. As shown, the actuators of switches 46 and 48 would extend through the overlay 38 at hole locations 42 and 44, respectively, but the actuators of switches 45 and 47 would be engaged by the overlay at locations 41 and 43, respectively, where there are no holes in the overlay, as shown in FIGS. 2B and 2A, respectively.

The light-weight overlay 38 may be made of a thin, relatively tough, translucent, plastic material, such as a polyester, on which the labels identifying the keys R1–R9 may be printed. The overlay is maintained in position on the keyboard 24 by a relatively heavy (compared to the overlay) holding plate 50 having openings corresponding to the positions of the keys R1–R9. The holding plate 50 is transparent and both it and the translucent plate 39 may conveniently be made of a methyl methacrylate material, such as those known commercially as Lucite and Plexiglas, approximately one-eighth inch thick.

The holding plate 50 is provided with a plurality of holes 51–54 which extend part way through the plate from its underside (as seen in FIGS. 2 and 2A) and correspond in location to the locations 41–44, respectively, in the overlay 38. The primary purpose of the holes 51–54 in the plate 50 is to ensure that the plate does not engage any of the actuators of the switches 45–48 that may extend upwardly through holes in the overlay 38. It is pointed out that the holes 51–54 in the plate 50 are made only slightly larger than the actuators of the switches 45–48. This prevents the actuators from pushing the overlay 38 up into the holes 51–54 in those locations where there are no holes in the overlay, and permits the use of thin, relative flexible, inexpensive overlays. The plate 50 may be hinged, if desired, and spring loaded to keep it down against the keyboard or other conventional means such as latches used for that purpose.

The arrangement shown in FIG. 2 of four switches 45–48 and corresponding hole locations in the overlay 38 and the plate 50 is shown for purposes of illustration only. In practice, any desired number may be utilized, depending on the number of computer routines from which a selection is to be made. It is thus possible to have a large number of different, inexpensive overlays 38 and only one of the more expensive holding plates 50.

It is particularly pointed out that no overlay 38 has a hole at location 41. This insures that the switch 45, hereafter referred to as the "overlay switch," is actuated whenever an overlay is in position, along with such switches 46–48 as are actuated to identify the particular overlay.

Although the switches 45–48 have been described as having normally open contacts which are closed when there is no corresponding opening in the overlay 38, it is apparent that the switches 46, 47, 48 could have normally closed contacts which are opened when there is no corresponding opening in the overlay. In that case, of course, the coding of the various overlays would be complementary to that used with normally-open contact switches. It is preferred that the overlay switch 45 be of the normally-open contact type, so that the presence of an overlay in place on the keyboard will close its contacts.

Attention is now called to FIGURE 4 wherein is shown the circuit arrangement used to generate coded signals initiated by actuation of the keys and switches associated with keyboard 24. It will be noted that keys R8 and R9 serve merely as spares and are not connected in the circuit. Keys R2–R6 are each actuators of normally open single pole switches. Key R1 is an actuator of a double pole switch, both switch segments being normally open. Key R7 is the actuator of a "make before break" double pole switch in which the normally open upper switch segment operates prior to the normally closed lower switch segment. All of the switches actuated by keys R1–R7 are of the pulse type such that they only momentarily close or open as the case may be, regardless of how long the keys are depressed.

A battery 60 is connected at a first terminal to ground. Previously-mentioned overlay switch 45 is connected between the second battery terminal (which will hereinafter be referred to as the high voltage level with ground being referred to as the low voltage level) and junction 62. The upper switch segment associated with key R1 is connected on a first side to junction 62 and on a second side to signature lines No. 1 and No. 2 through diodes 64 and 66 respectively and to data lines No. 1, No. 2 and No. 3 through diodes 68, 70 and 72, connected respectively in series with previously mentioned overlay identification switches 46, 47 and 48, respectively. The lower switch segment associated with key R1 is connected between junction 62 and conductor 74 which in turn is connected to ground through the normally closed lower switch segment associated with key R7 and coil 76 of relay 78.

Relay 78 operates ganged switch segment 80, which is normally open and segments 82 and 84 which are normally closed. Switch segment 80 serves as a holding switch to maintain relay 78 energized after the lower switch segment associated with key R1 has closed and opened. Switch segment 82 serves to operate indicator light 86 (among indicators 16 on housing 10) which remains illuminated at all times except after an overlay sheet 38 has been placed over keyboard 24 to close switch 45, and key R1 has been depressed. The effect of the light 86 being off is to advise an operator that an overlay code has been generated and transmitted to the computer and that request keys R2–R7 may now be depressed. Switch segment 84 serves to control the key lights LR1–LR9 and the label lights LC1–LC9 by disabling them when relay 78 is not energized, in a manner to be more thoroughly discussed below.

Each of the switches associated with keys R2–R6 and the upper switch segment associated with key R7 is connected between conductor 74 and signature line No. 2 through diodes 88, 90, 92, 94, 96, 98 respectively. Diode 100 connects the switch associated with key R2 to data line No. 1. Diodes 102, 104, 106, 108, 110, 112, 114 and 116 connect the switches associated with keys R3–R7 to the data lines so that each switch is capable of generating a unique signal on the data lines.

With an overlay sheet 38 in place over the keyboard 24, switch 45 will be closed and such switches of switches 46, 47, 48 as are necessary to identify the particular sheet will be closed. When key R1 is depressed, a high voltage pulse will be applied to signature lines No. 1 and No. 2 and such of the data lines as are connected to closed switches of switches 46, 47, 48. Also, relay 78 will be energized and a high voltage level will be applied to conductor 74. When any of keys R2–R6 are then depressed, a high voltage pulse will be applied to signature line No. 2 and only certain data lines. For example, depression of key R3 causes a high voltage pulse to be applied to data line No. 2. Depression of key R7 causes the normally upper switch segment associated therewith to close before the normally closed lower switch segment opens so that high voltage pulses are applied to signature line No. 2 and data lines No. 2 and No. 3 before the high voltage level is removed from conductor 74.

It will therefore be appreciated that the circuit arrangement of FIGURE 4 performs the function of generating coded signals on data lines No. 1, No. 2 and No. 3 identifying the overlay sheet 38 in place. These coded signals, in a manner to be described, are sent to the computer 28 and initiate operations which cause a stored routine, corresponding to the problem area designated by the human language labels on the overlay, to be deposited in an active file. The circuit arrangement of FIGURE 4 in addition performs the function of generating coded signals identifying a particular request key R2–R7 that has been depressed. These coded signals, in a manner to be described, are sent to the computer 28 and initiate the performance of subroutines of the routine in the active file, the subroutines corresponding to the request designated by the human language on the translucent sheet portion T2–T7 adjacent the request key to which the signals correspond.

Figure 5:
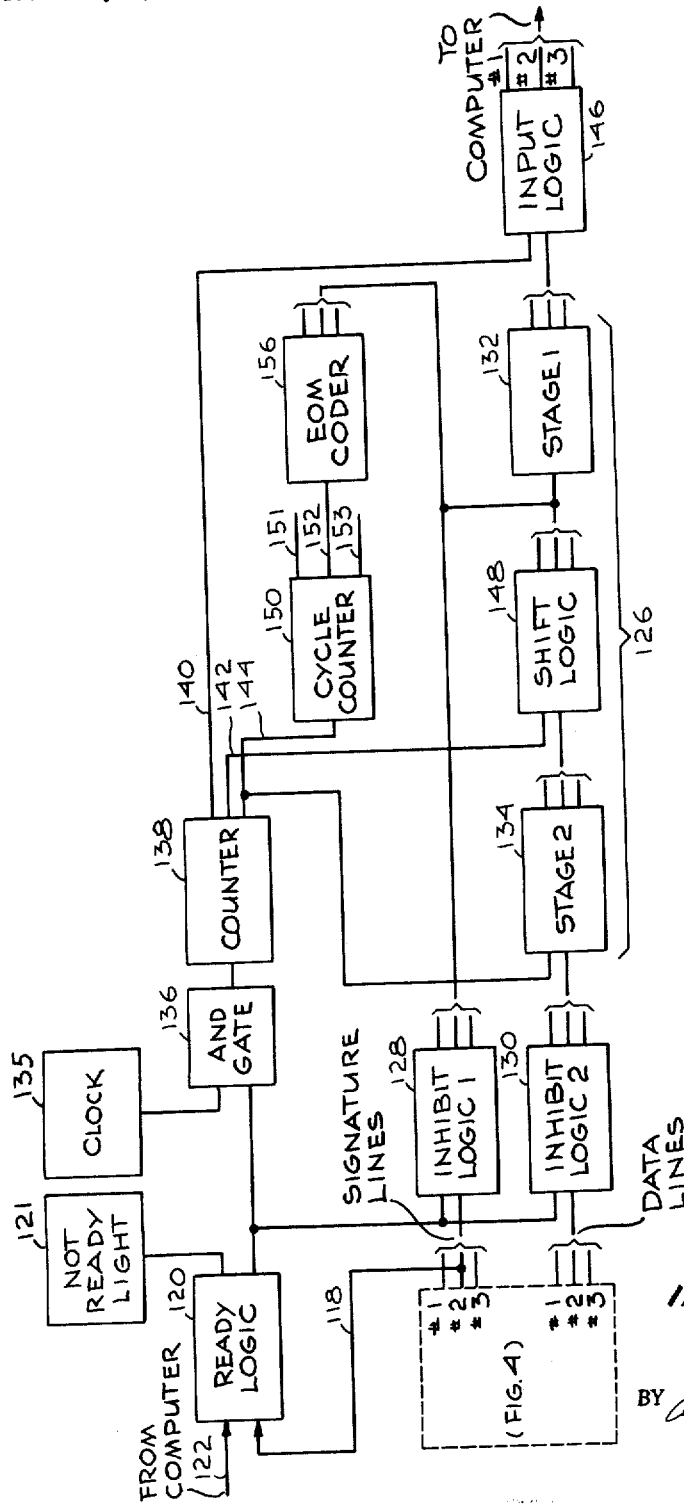
FIGURE 5 is a block diagram of a portion of the input circuits of FIGURE 3.

Attention is now called to FIGURE 5 wherein is shown a block diagram illustrating the arrangement employed to couple the coded signals generated by the circuit arrangement of FIGURE 4 to the computer 28. The blocks of FIGURE 5 represent a more detailed showing of the elements necessary to the "input circuits" block 26 of FIGURE 3. In addition to the blocks shown in FIGURE 5, the "input circuits" may include appropriate buffer equipment, if needed, to compensate for inequalities in speed between computer operation and the rate at which input information can be generated. Inasmuch as it is desirable to reduce the necessary number of conductors connecting the input circuits 26 to the computer 28, a preferred means of transmission is to send the necessary signals sequentially rather than simultaneously. Accordingly, circuits are arranged as shown in FIGURE 5 for initially sending the signature code and thereafter the data code.

In addition to the three signature lines and the three data lines extending from the circuit of FIGURE 4, conductor 118, connected to signature line No. 2 extends therefrom. From the foregoing discussion of FIGURE 4, it should be realized that a high voltage pulse on both signature lines No. 1 and No. 2 indicates that the signal on the data lines identifies a particular overlay sheet 38.

On the other hand, a high level voltage pulse on only signature line No. 2 indicates that the signal on the data lines identifies a particular key. It is apparent therefore that regardless of what code is being generated, a high voltage pulse will appear on signature line No. 2. Accordingly, conductor 118 is connected as one input to "ready logic" circuitry 120 together with conductor 122 which extends from the computer 28. At certain times the computer 28 may not be ready to accept information and at these times a flip-flop F1 (not shown) will be false so that a low voltage level appears on conductor 122 connected to the output of the flip-flop. When the input lines 118 and 122 to the "ready logic" circuitry 120 are respectively high and low, a "not ready light" 121 (among indicators 16 on housing 10) is energized to advise the operator that his input has not been transmitted to the computer. On the other hand, if conductor 118 is high when conductor 122 is high, the "ready logic" circuitry 120 impresses a high voltage level on conductor 124.

An input register 126 including "stage 1" 132 and "stage 2" 134, each having three flip-flops, is provided to store the signature signals and data signals respectively. The signature and data lines are connected to the appropriate stages of the input register 126 through "inhibit logic 1" gate 128 and "inhibit logic 2" gate 130 respectively. The gates 128 and 130 are controlled by the level on conductor 124 such that the signature and data signals are transferred to the input register 126 only if conductor 124 is high. The "ready logic" circuitry 120, the "inhibit logic 1" gate 128, and the "inhibit logic 2" gate 130 may all be formed of conventional "and," "or," etc. gates.

A clock 135 which provides a recurring square wave pulse and conductor 124 form inputs to an "and" gate 136 whose output is fed to "counter" 138. "Counter" 138 has three output lines 140, 142 and 144 which are pulsed sequentially. Line 140 is connected as an input to "input logic" gate 146 together with the three output lines from "stage 1" 132 and when line 140 is pulsed the signals stored in "stage 1" 132 are fed out to computer 28. Line 142 is connected as an input to "shift logic" gate 148 together with the three output lines from "stage 2" 134 and when line 142 is pulsed, the signals stored in "stage 2" 134 are shifted into "stage 1" 132. Line 144 is connected as an input to "cycle counter" 150 and "stage 2" 134. "Cycle counter" 150 and "counter" 138 may be identically constructed, it being necessary for each to count sequentially to three. "Cycle counter" 150 has three output lines 151, 152 and 153 but only line 152 is utilized. Each time line 144 is pulsed, meaning that "counter" 138 has completed a cycle, "cycle counter" 150 counts so that after the first cycle of "counter" 138, line 151 is pulsed, after the second cycle line 152 is pulsed, and after the third cycle line 153 is pulsed. When the keys R1–R7 of FIGURE 2 are depressed, the switches of FIGURE 4 are actuated and signature and data signals are read into "stage 1" 132 and "stage 2" 134 respectively and operation of "counter" 138 is initiated.

In the first cycle of counter 138, the sequential pulses on lines 140, 142 and 144 respectively cause the signature signals to be fed out of "stage 1" 132 to the computer, the data signals to be shifted from "stage 2" 134 to "stage 1" 132, to clear "stage 2" 134 and the "cycle counter" 150 to pulse line 151. In the second cycle of "counter" 138, the sequential pulses on lines 140, 142 and 144 respectively cause the data signals (now in "stage 1" 132) to be fed out to the computer, the cleared contents of "stage 2" 134 to be shifted into "stage 1" 132 and the "cycle counter" 138 to pulse line 152 connected to "EOM coder" 156 to cause the end of message code to be generated and stored in "stage 1" 132. Referring momentarily to the details of the "EOM coder" 156 in FIGURE 6, it will be noted that the end of message code constitutes three high level pulses which it will be recalled represents the code which has not been used to represent either signature or data signals. In the third cycle of "counter" 138, the end of message code (now in "stage 1" 132) is fed out to the computer 28, the cleared contents of "stage 2" 134 are shifted into "stage 1" 132 and the "cycle counter" 150 pulses line 153. As will be more fully appreciated below in connection with the discussion of FIGURE 9, the operation of the equipment of FIGURE 5 ceases as the recognition of the end of message code by the computer 28 sets flip-flop F1 (not shown) false so as to cause conductor 122 to fall to a low level thereby causing line 124 to fall to thereby prevent "counter" 138 from counting further.

Attention is now called to FIGURE 7 wherein the relationship between an exemplary output from "input logic" 146 and the output of clock 135 is illustrated. It has been assumed that key R1 has been depressed and that a particular overlay sheet 38 having no hole at location 43 has been placed over the keyboard 24. During the first cycle of "counter" 138 pulses are applied to "input logic" output lines No. 1 and No. 2 at the first clock pulse representing an overlay signature and indicating that the data following is associated with a particular overlay sheet 38 rather than one of the keys R1–R9. During the second cycle, only line No. 2 is pulsed meaning that overlay No. 2 (assuming a binary code) is in place over keyboard 24, which actuates the switch 47. During the third cycle, lines 1, 2 and 3 are pulsed representing the end of message code. By recognizing the data representing the overlay in place on keyboard 24, the computer 28 is able to perform operations consistent with the human language labels on the sheet.

Reference is now made to FIGURE 9 with momentary attention being paid to FIGURE 8 for the purpose of introducing the reader to the nomenclature used in the flow diagram of FIGURE 9 depicting a portion of the operation of computer 28. In order to explain the operation of computer 28, logical equations representing the operations occurring in each word period are shown in FIGURE 9 beneath a numbered block. Each of the numbered blocks represents a different state of a state counter (not shown). This system of computer sequencing is well known in the art and need not be discussed other than to point out that the state counter tends to increase its count in an orderly fashion as the one-word period operations are sequenced from left to right on the flow diagram. However, a control flip-flop K1 is provided for control so that the state counter can be forced to "stick," that is keep the same count for several word periods or "skip," that is deviate from the orderly counting fashion. A counter (not shown) fed by a recurring clock signal provides the input signal at the end of each word period to cause the state counter to change state. The control flip-flop K1 serves to control the state to which the state counter changes. The control flip-flop K1 is capable of being in either of two discrete states; that is either true or false or correspondingly storing a "1" or "0." The system is defined such that the state counter will count in an orderly fashion at the end of each word period as long as the control flip-flop K1 is false but that it will either "stick" or "skip" if the control flip-flop K1 is true. Referring to the blocks of FIGURE 9, it will be seen that horizontal and vertical lines extend from the right side of the blocks. If the control flip-flop K1 is false at the end of a word period, the state counter increases its count by one, and follows the horizontal line as e.g. from state block 3 to state block 4. If on the other hand, the control flip-flop K1 is true at the end of a word period, the state counter follows the vertical line and "sticks" or "skips," as e.g. from state block 2 to state block 8. The discrete states of the state counter are significant because in each state only those circuits necessary to cause the operations described by the logical equations under the state blocks are rendered operative. A brief description of the computer operations in the various states is set forth in each state block.

A generic representation of a flip-flop is offered in FIGURE 8 for the purpose of introducing the nomenclature used in FIGURE 9. Flip-flop K1 in FIGURE 8 has two inputs and two complementary outputs. When output line K1 is high, output line K1' is low and the flip-flop is said to be true or storing a digit 1. On the other hand, when output line K1 is low, output line K1' is high and the flip-flop is said to be false or storing a digit 0. Whereas the flip-flop outputs are designated by upper case letters, the inputs to the flip-flop are designated by corresponding lower case letters with a subscript "0" (e.g. $_0k_1$) prefixing the input which when triggered, causes the flip-flop to become false and the subscript "1" (e.g. $_1k_1$) prefixing the input which, when triggered, causes the flip-flop to become true. The inputs to the flip-flop are controlled by gates which perform logical functions in the presence of computer clock pulses.

With the above explanation thought sufficient to enable an understanding of the computer flow diagram, attention is now directed to FIGURE 9 which depicts the operations performed by the computer. Broadly, the operations include initially recognizing an end of message code so as to cause a low level to be applied to conductor 122 (FIGURE 5) and then determining whether the signature signals are representative of an overlay or a key. If overlay signature signals are presented, the accompanying data signals are compared with the address of a routine presently stored in an active file. If the comparison reveals that the data signals correspond to the routine already in the active file, nothing further need be done and the computer returns to its idle state. If, on the other hand, the comparison does not reveal correspondence, the total routine library must be searched for the routine corresponding to the accompanying data signals and the located routine must then be written into the active file before the computer returns to its idle state. If the signature signals were representative of a key, the computer would utilize the accompanying data signals to locate the subroutine in the routine in the active file to which it corresponds and then perform the subroutine prior to returning to its idle state.

The output signals from the "input logic" 146 (FIGURE 5) are held in a temporary register (not shown), which will be referred to as the B register, which includes flip-flops B1–B9. The signature signals which are outputted during the first cycle of counter 138 (FIGURE 5) will be held in flip-flops B1–B3, the data signals in flip-flops B4–B6 and the end of message code in flip-flops B7–B9. The computer in state 1 is in an idle condition and since flip-flop K1 has been preset true, sticks in state 1 until the end of a word period in which the end of message code is read into flip-flops B7–B9. As expressed by the logic equation $_0k_1 = B_7B_8B_9$, flip-flop K1 is set false by the end of message code and the computer enters state 2. The end of message code also sets flip-flop R1 false so that a low voltage level appears on conductor 22 (FIGURE 5).

In state 2 flip-flop B1 is looked at to determine whether the signature is representative of an overlay or a key, it being recalled from FIGURE 4 that the overlay signature is characterized by a "1" in its first position while the key signature is characterized by a "0." If flip-flop B1 is false, control flip-flop K1 is set true and the state counter skips to state 8. If flip-flop B1 is true, the computer enters state 3.

In state 3, flip-flops E4–E6 of an E register (not shown) are used to compare for equality between flip-flops S4–S6 of an S register (not shown) in which the address of the routine presently stored in an active file (not shown) is stored. As expressed by the logical equations beneath state block 3, flip-flops E4–E6 are all set false if equality does exist meaning that the desired routine is already in the active file.

In state 4, control flip-flop K1 is set true if flip-flops E4–E6 are all false and the computer thereby enters state 7. On the other hand, if flip-flops E4–E6 are not all false, the computer proceeds to state 5.

In state 5, the data stored in flip-flops B4–B6 is written into flip-flops S4–S6.

In state 6, the total routine library (not shown) is searched to locate the routine having the address corresponding to the address stored in flip-flops S4–S6 and the located routine is then written into the active file (not shown) and the computer enters state 7.

In state 8, which the computer could enter after state 2, the routine in the active file is searched for the subroutine whose address corresponds to the data and the located subroutine is performed and the computer then enters state 7.

In state 7, flip-flops F1, K1 and E4–E6 are set true and the computer enters state 1.

In summary, the computer serves to distinguish between overlay and key signatures, uses overlay data to compare the requested routine with the routine already in the active file and writes a new routine in the active file if necessary or uses key data to initiate the performance of a subroutine. Performance of the subroutine generally provides output data in the form of displays which are immediately presented to the operator on cathode ray tube 14.

Depending on the output presented to the operator, the operator may want to investigate the problem further by, e.g., modifying data to investigate hypothetical situations, or merely looking at the presented data in more detail or in a different context. In problem analysis, it is often desirable to follow certain prescribed sequences. Also, it is sometimes impossible for the computer to perform certain requests until certain data is supplied by the operator and the operator may be unable to supply this necessary data until he partially investigates the problem. In order to lead the operator through a possibly complex processing chain, the previously mentioned light sources LC1–LC9 and LR1–LR9 are provided beneath the labeled translucent sheet portions T1–T9 and translucent keys R1–R9 respectively.

Writing a routine in the active file or performance of a subroutine causes appropriate data to be written into a circulating register 180 (FIGURE 10) which may include e.g. a drum. The "illuminator logic" 34 (FIGURE 3) includes a matrix arrangement shown in FIGURE 10 controlled by the circulating register 180 and a word counter 182 to operate light memory units 170 which are associated with each light source LC1–LC9 and LR1–LR9. The information in the circulating register 180 is always modified after one of the keys R1–R7 is depressed so that the light source beneath the last key depressed will be illuminated to advise the operator of his most recent action. Also, the light sources LC1–LC9 in the cavities C1–C9 are selectively illuminated beneath the labeled translucent sheet portions to advise the operator of what requests he may next logically make.

The light memory units 170 are shown in detail in FIGURE 11 and comprise a flip-flop L1 and an "and" gate 172. Conductor 174 connects switch 84 (FIGURE 4) to the input of flip-flop L1 which causes the flip-flop L1 to store a "0" whenever a high voltage level appears on conductor 174. The logical equation $_0l_1 = D$ where "D" represents the level on conductor 174 shows that the light source connected to flip-flop L1 is prevented from becoming illuminated as long as switch 84 is closed. The logical equation $_1l_1 = D'WA$ where "A" represents the circulating register and "W" the word counter, shows that the flip-flop L1 is caused to store a "1" to illuminate the connected light source whenever the level on conductor 174 is not high and the lines from the word counter and circulating register are both high.

From the foregoing, it should be appreciated that the invention herein provides means which enable an operator, unskilled in computer language and techniques, to communicate with a computer in the language of the operator's are which is set forth as labels on the described overlay sheets. Moreover, the invention includes means so that by virtue of the removable overlays, its functions can be rapidly changed so as to facilitate the solution of many diverse problems requiring joint human-computer effort, the invention being characterized by an input section including keys used by the operator to send messages to the computer and an output section including lights controlled by the computer for directing the operator through complex problem analysis.

Although the device of the invention has been described in connection with a computer having routines and subroutines stored therein, it is apparent that it is not limited to use with a computer. For example, as a subcombination, the device may be used as a control or input device with the overlay acting to select any one or more of a plurality of primary electrical circuits and the keyboard acting to select secondary circuits from the primary circuits.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The embodiments of the invention in which an exclusive property or privilege is claimed are defined as follows:

1. In combination with a computer storing a plurality of routines, in which each routine may include a plurality of subroutines, a device coupled to the computer and including
   first means for dispatching a coded message to the computer identifiable with a particular routine, and
   second means for dispatching coded messages to the computer identifiable with particular subroutines in any routine,
   said second means including a plurality of subroutine actuating keys,
   said first means including a sheet having at least one opening for selectively preventing actuation of switch means by said sheet to generate a code identifiable with a particular routine,
   said sheet being receivable over said keys with said keys projecting through second openings, and
   labels on said sheet adjacent each of said second openings for indicating the subroutine corresponding to each key.

2. The combination of claim 1 including
   light sources associated with each of said keys and each of said labels, and
   computer controlled means connected to said light sources for effecting the selective illumination thereof.

3. The combination of claim 1 wherein said device further includes
   a first set of light sources and a second set of light sources,
   each light source of said first set associated with one of said labels when said sheet is properly positioned over said keys,
   each light source of said second set associated with one of said keys, and
   third means coupling said light sources to the output of said computer for selectively illuminating said light sources in response to computer controlled messages.

4. In combination with a computer storing a plurality of routines each of which may include a plurality of subroutines, a device connected to the computer input for initiating computer operations comprising:
   a keyboard including a plurality of subroutines actuating keys,
   sheet means providing a set of labels for labeling each of said keys according to the subroutine it initiates,
   said sheet means having openings therein for selectively preventing actuation of switch means for generating a signal identifying said set of labels, and
   means operatively connected to each of said keys for generating a key identification signal in response to actuation of a particular key.

5. In combination with a computer storing a plurality of routines each of which may include a plurality of subroutines, a device connected to the computer input for initiating computer operations comprising:
   a keyboard including a plurality of subroutine actuating keys,
   sheet means providing a set of labels for labeling each of said keys according to the subroutine it initiates,
   said sheet means having openings therein for selectively preventing actuation of switch means for generating a signal identifying said set of labels,
   second means operatively connected to each of said keys for generating a key identification signal in response to actuation of a particular key, and
   third means preventing generation of said key identification signal prior to the generation of said signal identifying said set of labels.

6. In combination with a computer storing a plurality of routines each of which may include a plurality of subroutines, a device for initiating computer operations comprising:
   a keyboard including a plurality of subroutine actuating keys,
   sheet means providing a set of labels for labeling each of said keys according to the subroutine it initiates,
   second means operatively connected to each of said keys for generating a key identification signal in response to actuation of a particular key,
   said sheet means having labels thereon adapted to be received over said keyboard and having first openings therein with said keys projectible through said first openings so that each key becomes associated by position with one of said labels, and
   a code generating circuit including a plurality of switches,
   said sheet means selectively actuating said switches for identifying said set of labels and having second openings therein for preventing actuation of selected switches.

7. In combination with a computer storing a plurality of routines each of which may include a plurality of subroutines, a device for initiating computer operations comprising:
   a keyboard including a plurality of subroutine actuating keys,
   sheet means providing a set of labels for labeling each of said keys according to the subroutine it initiates,
   second means operatively connected to each of said keys for generating in response to actuation of a particular key, a key identification signal,
   said sheet means having labels thereon adapted to be received over said keyboard and having first openings therein with said keys projectible through said first openings so that each key becomes associated by position with one of said labels,
   a code generating circuit including a plurality of switches,
   said sheet means selectively actuating said switches for identifying said set of labels and having second openings therein for preventing actuation of selected switches, and
   third means preventing generation of said key identification signal prior to operation of said switches.

8. An input device for use with a computer comprising:
   a keyboard,
   a sheet having labels thereon and first openings therein adapted to overlay said keyboard with each of the keys of said keyboard projecting through said first openings and becoming associated by position with one of said labels, a code generating circuit including a plurality of switches, means operatively connecting each of said keys to one of said switches such that actuation of a particular key operates a particular switch to generate a code identifiable with said particular key, and means acting on said sheet to cause said sheet to operate certain of said switches for generating a code identifiable with said sheet, said sheet having second openings for preventing operation of certain of said switches.

9. In combination with a computer storing a plurality of routines, in which each routine may include a plurality of subroutines, a device coupled to the computer and including first means for dispatching a coded message to the computer identifiable with a particular routine, and second means for dispatching coded messages to the computer identifiable with particular subroutines in any routine, said second means including a plurality of subroutine actuating keys, said first means including controllable coded-message generating means, a sheet having means for actuating said generating means, and holding means for holding said sheet in position for actuating said generating means.

10. A control device for selecting at least one primary function from a plurality of primary functions and at least one secondary function from a plurality of secondary functions associated with each of said primary functions, comprising:

keyboard means including a plurality of secondary function selecting keys, sheet means providing a set of labels for identifying each of said selecting keys according to the secondary function it is adapted to select, and a plurality of primary function selecting means controllable by said sheet means to select said primary functions, said sheet means having at least one opening therein for selectively preventing actuation of at least one of said primary function selecting means by said sheet means.

11. A control device for selecting at least one primary function from a plurality of primary functions and at least one secondary function from a plurality of secondary functions associated with each of said primary functions, comprising:

keyboard means including a plurality of secondary function selecting keys, sheet means providing a set of labels for identifying each of said selecting keys according to the secondary function it is adapted to select, and a plurality of switch means actuatable by said sheet means to select said primary functions, said sheet means having at least one opening therein for selectively preventing actuation of at least one of said plurality of switch means.

12. A control device for selecting at least one primary function from a plurality of primary functions and at least one secondary function from a plurality of secondary functions associated with each of said primary functions, comprising:

keyboard means including a plurality of secondary function selecting keys, sheet means providing a set of labels for identifying each of said selecting keys according to the secondary function it is adapted to select, said sheet means having labels thereon adapted to be received over said keyboard means and having first openings therein with said keys projectible through said first openings so that each key becomes associated by position with one of said labels, and a plurality of switches actuatable to select said primary functions, said plurality of switches being located to be actuated by said sheet means when said sheet means is properly positioned on said keyboard means, said sheet means having at least one second opening therein for selectively preventing actuation of at least one said switch for selecting a desired one of said primary functions.

13. The device defined by claim 12 further including means for preventing selection of said secondary function until after said primary function has been selected.

14. The device defined by claim 13, wherein said means for preventing selection of said secondary function includes a switch adapted to be actuated by said sheet means when properly positioned on said keyboard means.

15. A control device for selecting at least one primary function from a plurality of primary functions and at least one secondary function from a plurality of secondary functions associated with each of said primary functions, comprising:

a keyboard including a plurality of secondary function selecting keys, an overlay sheet for said keyboard having first openings therein with said keys projectible through said first openings, and a plurality of primary function selecting means actuatable by said overlay sheet, when said overlay sheet is in place on said keyboard, to select said primary functions, said overlay sheet having at least one second opening therein for selectively preventing actuation of at least one of said primary function selecting means by said overlay sheet.

16. The device defined by claim 15 further including means for holding said overlay sheet on said keyboard in position to actuate said primary function selecting means.

17. A control device for selecting at least one primary function from a plurality of primary functions and at least one secondary function from a plurality of secondary functions associated with each of said primary functions, comprising:

a keyboard including a plurality of secondary function selecting keys, a thin, relatively flexible overlay sheet for said keyboard providing a set of labels for labeling each of said selecting keys according to the secondary function it is adapted to select, said overlay sheet having first openings therein with said keys projectible through said first openings, a plurality of switches actuatable by said overlay sheet to select said primary functions, said overlay sheet having at least one second opening therein for selectively preventing actuation of at least one of said plurality of switches, and means for holding said overlay sheet on said keyboard in position to actuate said switches.

18. A control device for selecting at least one primary function from a plurality of primary functions and at least one secondary function from a plurality of secondary functions associated with each of said primary functions, comprising:

a keyboard including a plurality of secondary function selecting keys, a thin, relatively flexible, translucent overlay sheet for said keyboard providing a set of labels for labeling each of said selecting keys according to the secondary function it is adapted to select, said overlay sheet having labels thereon adapted to be received over said keyboard means and having first openings therein with said keys projectible through said first openings so that each key becomes associated by position with one of said labels, and a plurality of switches actuatable to select said primary functions, each of said plurality of switches having an actuator located to be actuated by said overlay sheet when properly positioned on said keyboard means, said sheet means having at least one second opening therein for receiving at least one of said actuators for selectively preventing actuation of at least one said switch for selecting a desired one of said primary functions.

19. The device defined by claim 18 is further including means for holding said overlay sheet on said keyboard in position to actuate said actuators.

20. The device defined by claim 18 further including a relatively rigid holding plate for holding said overlay sheet on said keyboard in position to actuate said actuators, said holding plates having openings thereinto receive any of said actuators that project through said overlay sheet and prevent actuation thereof.

No references cited.